United States Patent Office.

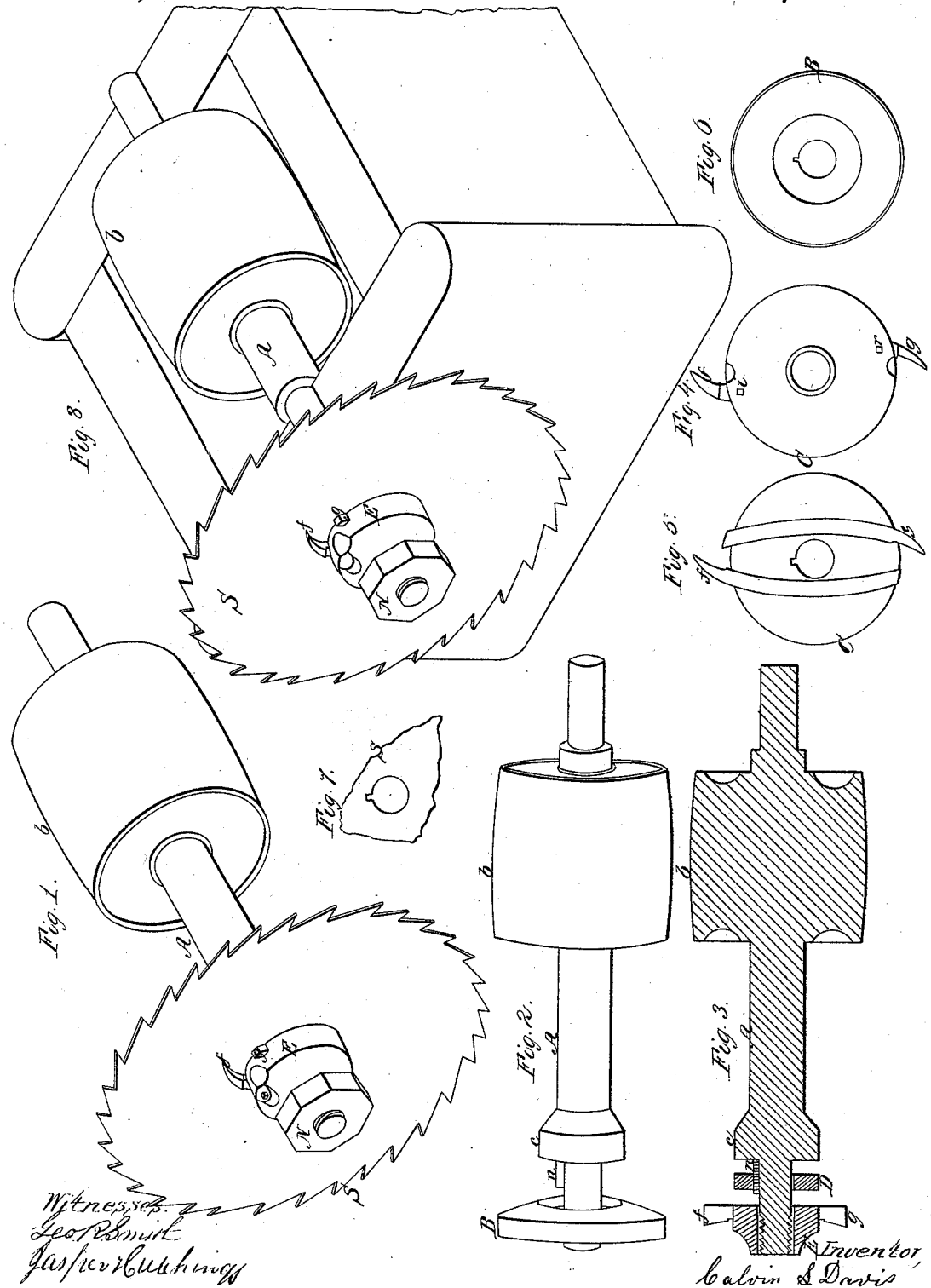

CALVIN S. DAVIS, OF ORONO, ASSIGNOR TO HIMSELF AND THOMAS N. EGERY, OF BANGOR, MAINE.

Letters Patent No. 97,484, dated December 7, 1869.

IMPROVEMENT IN CLAPBOARD-MACHINE.

The Schedule referred to in these Letters Patent and making part of the same.

*To all whom it may concern:*

Be it known that I, CALVIN S. DAVIS, of Orono, in the county of Penobscot, and State of Maine, have invented certain new and useful Improvements in Clapboard-Machines; and I do hereby declare that the following is a full and exact description thereof, reference being had to the accompanying drawings, and to the letters of reference marked thereon.

My invention consists in the use of adjustable sappers, of peculiar construction, and applied to the outside collar, in a novel manner.

In the accompanying drawings—

Figure 1 is a perspective view of the shaft A, pulley $b$, saw S, small outside collar E, carrying the sappers $f\,g$, and of the nut N.

Figure 2 is perspective view of shaft A, pulley $b$, small shoulder $c$, key $n$, and large inside collar B.

Figure 3 is a longitudinal view of shaft A, pulley $b$, shoulder $c$, key $n$, small inside collar D, and small outside collar E, carrying the sappers $f\,g$.

Figure 4 is a front view of large outside collar C, with sappers $f\,g$ and set-screws $i\,r$.

Figure 5 is a view of that face of outside collar C which presses against the saw.

Figure 6 is a rear view of large inside collar B.

Figure 7 is a view of fragment of the saw S.

Figure 8 is a perspective view of the saw, as overhung in a clapboard-machine.

To enable others skilled in the art to make and use my invention, I will now proceed to describe its construction and operation.

I construct the shaft A, and provide the same with the pulley $b$, shoulder $c$, and key $n$, as shown in figs. 2 and 3.

The end of the shaft is threaded, to receive the nut N, as shown in figs. 3 and 1.

The pulley $b$ is situated entirely in the rear of the machine, and distant from the saw, as shown in the drawings, and the saw is overhung, as shown in fig. 8.

I construct a series of removable and adjustable collars, of various diameters, two sizes of which are shown in the drawings, viz, small size, E D, figs. 3 and 1, and large size, B C, figs. 2, 6, 4, and 5.

The inside collars, although of different diameters, are of the same thickness.

The large inside collars, however, are provided with a flange, as shown in figs. 2 and 6, so as to fit over the shoulder $c$, when in place.

For a clapboard-saw, I construct adjustable sappers $f\,g$, and place them in slots in the outside collar, as shown in fig. 5, and provide set-screws $i\,r$ to hold them in place, as shown in figs. 4 and 1.

The shaft being placed in its bearings, the saw is hung, and sappers adjusted, as follows:

The inside collar D, fig. 3, is placed upon the shaft, and pressed back to the shoulder $c$.

The saw S is placed on the shaft, and pressed back to the collar D.

The outside collar E is placed on the shaft, and pressed back to the saw S.

The collar D, saw S, and collar E, are prevented from turning upon the shaft by the key $n$, and are held firmly in place against the shoulder $c$, by binding-nut N, fig. 1.

The sappers $f\,g$, which, for the purpose of adjustment, move freely in the slots in the collar, are first adjusted according to the diameter or size of the saw, and then secured by turning the screws $i\,r$, figs. 4 and 1.

The sappers are thus held between the face of the saw and the set-screws.

The resultant pressure does not bend the saw, the saw being sustained by the inside collar.

With larger saws, larger collars are used on both sides of the saw.

The adjustable collars are intended to keep the saws stiff and true, so that they can stand rapidity of motion and feed.

By means of these collars, it is evident that saws of different sizes may be used upon the same shaft, and that as a saw is worn down in use, it may be readily fitted with smaller collars.

As before mentioned, the inside collars are all of the same thickness, so that, through all changes of collars, the saw is kept at the same distance from the shoulder on the shaft.

In ordinary clapboard-machines, stationary collars are shrunk on the shaft, the saw attached to the stationary collar by bolts and nuts, the saw is centre-hung between the bearings, and the pulley is close to the saw.

It will be readily seen, that as in such case the collar is stationary, or permanently fixed to the shaft, the size of the saw which can be used depends on the size of the fixed collar; for a saw much larger than the collar is not stiffened by the collar, so as to stand speed of revolution or rapidity of feed, and then as soon as the saw is worn down about two inches, the stationary collar strikes the clapboard-bolt, and the saw has to be thrown aside.

Again, in order to change the centre-hung saw, the shaft must be raised from its bearings, and the various nuts and bolts removed and replaced—an operation, practically, of hours' duration.

Again, in ordinary machines, the saw is so near the pulley, that the clapboard-bolt is apt to interfere, in various ways, with the belt driving the pulley.

Again, the sappers themselves, as heretofore used, are slotted, and held on stationary collars, and adjusted, each, by two set-screws through the slots, and therefore, when somewhat worn, must be removed and repointed, as they cannot be ground down much, owing to the slots.

In my improved clapboard-machine, a much larger saw can be used; the ordinary saw can be worn down six inches or more; the saw can be removed and another hung in five minutes, rendering it practicable to remove the saw for filing, the machine operating with another saw while the filing is being done; the clapboard-bolt does not interfere with the belts; the sappers are cheaply constructed and attached; can be quickly adjusted, and can be used and sharpened until reduced to about one-third their length.

Four, six, and eight-inch collars will generally be found sufficient for a clapboard-saw of ordinary size; but, of course, these sizes may be reduced or varied.

I find, by practical test in my own mill, that (with the same crew) I can saw a thousand more clapboards per diem with my machine, than with any machine known to me, unprovided with my improvements.

The state of the art is so well known, that I have not considered it necessary to show or describe the method of communicating motion to the shaft, or the carriage for feeding the clapboard-bolt to the saw. I use the ordinary gears, belts, and carriage upon my machine.

I claim the combination, with a circular saw, of adjustable sappers $f\ g$, lying in transverse grooves in the collars, and flush with its surface, and set-screws to hold them to place against the face of the saw, all substantially as shown and described.

CALVIN S. DAVIS.

Witnesses:
   FRED. C. COOMBS,
   GEO. WING.